United States Patent
Scatterday et al.

(10) Patent No.: US 8,794,434 B2
(45) Date of Patent: *Aug. 5, 2014

(54) ELECTRONIC CIGARETTE CONTAINER

(71) Applicant: NJOY, Inc., Scottsdale, AZ (US)

(72) Inventors: Mark Scatterday, Scottsdale, AZ (US); Craig Weiss, Scottsdale, AZ (US)

(73) Assignee: NJOY, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,593

(22) Filed: Jul. 30, 2013

(65) Prior Publication Data

US 2013/0313139 A1    Nov. 28, 2013

Related U.S. Application Data

(63) Continuation of application No. 13/495,186, filed on Jun. 13, 2012.

(60) Provisional application No. 61/614,973, filed on Mar. 23, 2012.

(51) Int. Cl.
| | | |
|---|---|---|
| *B65D 85/10* | (2006.01) | |
| *A24F 13/14* | (2006.01) | |
| *A24F 15/12* | (2006.01) | |
| *A24F 15/10* | (2006.01) | |
| *A24F 15/14* | (2006.01) | |
| *B65D 43/16* | (2006.01) | |
| *B23P 11/00* | (2006.01) | |

(52) U.S. Cl.
CPC .................. *A24F 15/12* (2013.01); *A24F 13/14* (2013.01); *A24F 15/10* (2013.01); *A24F 15/14* (2013.01); *B65D 43/163* (2013.01); *B23P 11/00* (2013.01)

USPC .......................................... 206/266; 206/256

(58) Field of Classification Search
USPC ............ 206/85–95, 249, 252, 266, 242, 265, 206/272, 269, 256; 220/817, 818, 827, 830, 220/810

See application file for complete search history.

(56) References Cited

U.S. PATENT DOCUMENTS

| | | | | |
|---|---|---|---|---|
| 374,584 | A | * | 12/1887 | Cook ................................ 16/72 |
| 576,653 | A | * | 2/1897 | Bowlby .......................... 206/92 |
| 595,070 | A | * | 12/1897 | Oldenbusch .................. 220/829 |

(Continued)

FOREIGN PATENT DOCUMENTS

| | | |
|---|---|---|
| CN | 101869356 | 10/2010 |
| JP | 2001-165437 A | 6/2001 |

OTHER PUBLICATIONS

English abstract of JP 2001-165437 A (1 page).

*Primary Examiner* — Jacob K Ackun
*Assistant Examiner* — Jenine Pagan
(74) *Attorney, Agent, or Firm* — Bookoff McAndrews, PLLC

(57) ABSTRACT

The present disclosure generally relates to electronic cigarettes, and more particularly, to a container for storing the electronic cigarette. In one embodiment, the container includes a cover coupled to a base through a hinge. The hinge can provide three settings: opened, closed and middle. Within the base of the container, a number of sections can be provided. One section can enclose the hinge. At a distal end from the hinge, another section can include a portion where an electronic cigarette can be held. The section can incorporate a spring loaded mount whereby the electronic cigarette can be held firmly into place or loosely removed.

6 Claims, 3 Drawing Sheets

(56) References Cited

U.S. PATENT DOCUMENTS

| | | | |
|---|---|---|---|
| 799,844 A | 9/1905 | Fuller | |
| 969,076 A * | 8/1910 | Pender | 206/121 |
| 1,163,183 A * | 12/1915 | Stoll | 206/250 |
| 1,299,162 A * | 4/1919 | Fisher | 206/250 |
| 1,505,748 A * | 8/1924 | Tamis | 206/250 |
| 1,632,335 A | 6/1927 | Hiering | |
| 1,706,244 A | 3/1929 | Meyerson | |
| 1,845,340 A * | 2/1932 | Ritz Woller | 431/136 |
| 2,031,363 A | 2/1936 | Erikson | |
| 2,231,909 A | 2/1941 | Hempel | |
| 2,327,120 A * | 8/1943 | McCoon | 206/250 |
| 2,460,427 A | 2/1949 | Musselman et al. | |
| 2,483,304 A * | 9/1949 | Vogel | 220/324 |
| 2,765,949 A | 10/1956 | Hillman | |
| 2,897,958 A * | 8/1959 | Tarleton et al. | 206/250 |
| 3,420,360 A * | 1/1969 | Young | 206/259 |
| 3,861,523 A * | 1/1975 | Fountain et al. | 206/236 |
| 4,207,976 A | 6/1980 | Herman | |
| 4,798,310 A | 1/1989 | Kasai et al. | |
| 5,123,530 A * | 6/1992 | Lee | 206/249 |
| 5,605,226 A * | 2/1997 | Hernlein | 206/86 |
| 5,746,587 A * | 5/1998 | Racine et al. | 431/253 |
| 5,810,164 A * | 9/1998 | Rennecamp | 206/256 |
| 5,967,310 A | 10/1999 | Hill | |
| 6,269,966 B1 | 8/2001 | Pallo et al. | |
| 6,446,793 B1 | 9/2002 | Layshock | |
| 6,726,006 B1 * | 4/2004 | Funderburk et al. | 206/268 |
| 8,464,867 B2 * | 6/2013 | Holloway et al. | 206/250 |
| 2005/0118545 A1 | 6/2005 | Wong | |
| 2007/0098148 A1 | 5/2007 | Sherman | |
| 2011/0180433 A1 | 7/2011 | Rennecamp | |
| 2011/0265806 A1 * | 11/2011 | Alarcon et al. | 131/273 |
| 2011/0315701 A1 | 12/2011 | Everson | |
| 2012/0227753 A1 * | 9/2012 | Newton | 131/347 |
| 2012/0267383 A1 | 10/2012 | Van Rooyen | |

* cited by examiner

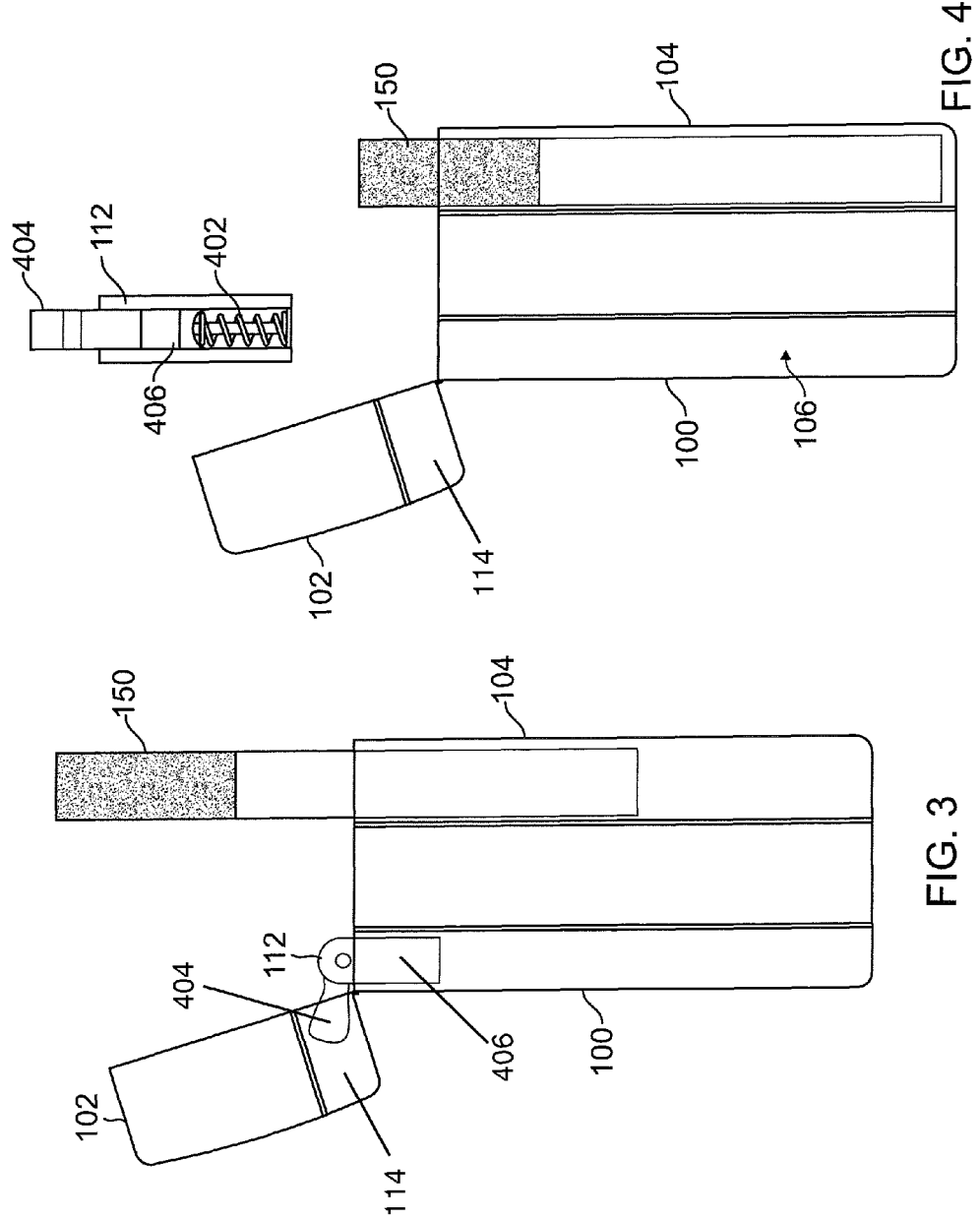

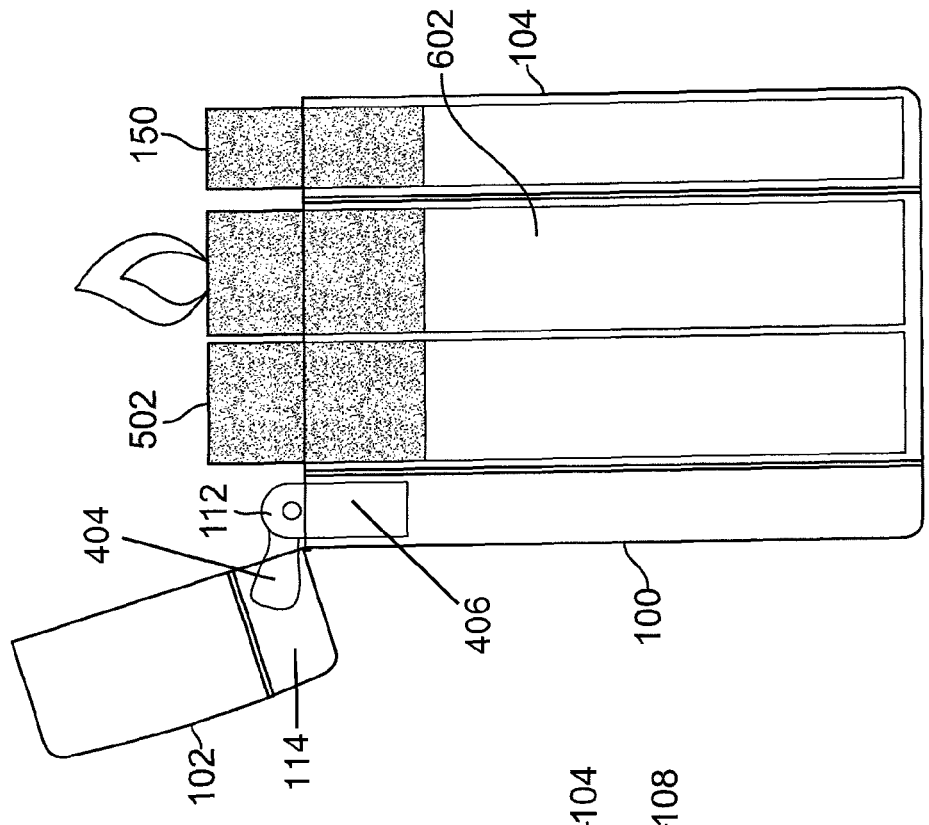
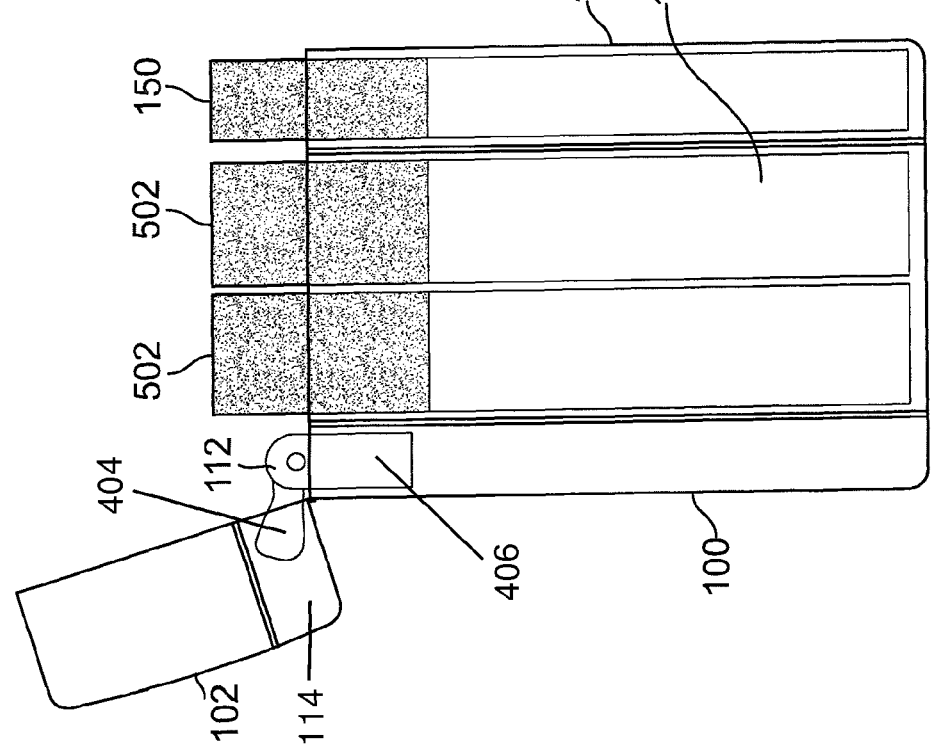

ELECTRONIC CIGARETTE CONTAINER

REFERENCE TO RELATED DISCLOSURES

This disclosure claims priority to U.S. Provisional Application No. 61/624,973 entitled ELECTRONIC CIGARETTE ATTACHMENTS, COMPONENTS AND HOLDERS to Mark Scatterday and Craig Weiss filed on Mar. 23, 2012, and is a continuation of U.S. application Ser. No. 13/495,186 entitled ELECTRONIC CIGARETTE CONTAINER to Mark Scatterday and Craig Weiss filed on Jun. 13, 2012, which is incorporated by reference herein in its entirety.

TECHNICAL FIELD

This disclosure generally relates to electronic cigarettes, and more particularly, to a container for an electronic cigarette.

BACKGROUND

Electronic cigarettes currently available on the market are an increasingly popular smoking alternative for users of traditional cigarettes. These cigarettes are designed to be stand alone products removing the need for packaging associated with a "pack" of cigarettes. Nevertheless, users tend to be both consumers of traditional and electronic cigarettes. A need therefore exists for a container to carry both types of smoking devices as well as provide additional features which will become apparent from the description provided below.

SUMMARY

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, an electronic cigarette container is provided. The container can include a cover, a base coupled to the cover and a pivoting hinge coupled to the cover and the base positioned at one end for opening and closing the electronic cigarette container. In addition, the container can include a slot positioned at a distal end within the base to hold an electronic cigarette.

In accordance with another aspect of the present disclosure, a container is provided. The container can include a top and a base coupled to the top. In addition, the container can include a hinge for raising and lowering the top from and to the base, wherein the base is sectioned into at least three sections, one section for securing the hinge, another section configured to hold an electronic cigarette and a middle section.

In accordance with yet another aspect of the present disclosure, a method for providing an electronic cigarette with at least one traditional cigarette is provided. The method can include sectioning a base into at least three compartments, one compartment housing the electronic cigarette. In addition, the method can include coupling the base to a top through a pivoting hinge, the pivoting hinge fitted into another compartment of the at least three compartments of the base, the pivoting hinge configured to place the top in an open, middle and closed position.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 3 is a side view of the exemplary container of FIG. 1 having the alternative smoking device extracted;

FIG. 4 is a side view of the exemplary container of FIG. 1 showing a sample closing mechanism for the holder;

FIG. 5 is a side view of the exemplary container of FIG. 1 having the alternative smoking device inserted along with other products; and FIG. 6 is a side view of the exemplary container of FIG. 1 having the alternative smoking device inserted along with other products and an ignition source.

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure generally relates to electronic cigarettes, and more particularly, to a container for storing the electronic cigarette. In one embodiment, the container includes a cover coupled to a base through a hinge. The hinge can provide three settings: opened, closed and middle. Within the base of the container, a number of sections can be provided. One section can enclose the hinge. At a distal end from the hinge, another section can include a portion where an electronic cigarette can be held. This section can incorporate a spring loaded mount whereby the electronic cigarette can be held firmly into place or loosely removed.

A number of advantages can be provided by the electronic cigarette container. The container can allow a user to carry both an electronic cigarette as well as a traditional cigarette. The container can also maintain a flame source for lighting the traditional cigarette. When sealed, the container prevents other liquids from entering in that could potentially damage the electronic cigarette and other contents therein. Furthermore, the shape of the container allows it to be placed within a pocket of a user. The container can also prevent the components within from being contaminated. A number of additional advantages will become apparent from the description provided below.

Figure 1:
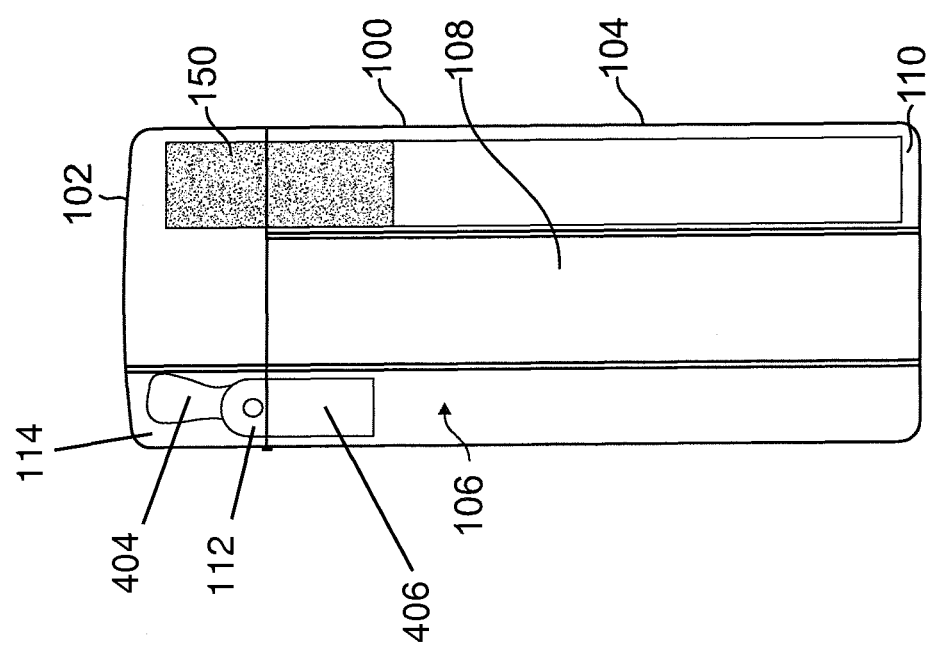
FIG. 1 is a side view of an exemplary container having a closed lid in accordance with one or more aspects of the present disclosure.

Turning to FIG. 1, a side view of an exemplary container 100 having a closed lid 102 in accordance with one or more aspects of the present disclosure is shown. While the container 100 can have a clear or opaque covering, other types of colors can be used. Labels can be provided over the container 100 that can cover the entire container 100 or portions of it. Brands can be displayed on the container 100. The container 100 can be made of a variety of materials including plastic and metal, to name a few.

The dimensions of the container 100 can be sized according to its contents. Typically, the container 100 has a very narrow depth. By way of a non-limiting example, the dimensions correspond to an electronic cigarette 150. The width of the electronic cigarette 150 can define the depth of the container 100. The length of the electronic cigarette 150 can define the height of the container 100. The width of the container 100 can be defined by the number of items placed within it. The width of the container 100 can be greater if the user intends to add other items into it.

When closed, the container 100 can protect the contents within it, which can include a traditional cigarette or other electronic cigarette 150. The shape of the cigarette 150 can include relatively flat portions surround by slender curved sections. The container 100 can include a cover 102 and base 104. The cover 102 can also be referred to as a top or top portion and the base 104 can be defined as a bottom or bottom portion. The cover 102 and base 104 can be designed such that when closed, a tight seal can be formed. This seal can prevent liquid from entering in and destroying the contents therein.

Within the interior of the container 100, a number of sections 106, 108 and 110 can be provided. The sections can extend along a length of the base 104 and partitioned to separate them. A first section 106 can be used to hold a hinge 112. The hinge 112 can also be referred to as a latching mechanism, closing and opening device, etc. The hinge 112 can extend to a portion within the section 106 or in the alternative, all the way to the bottom of the container 100. A section 114 within the cover 102 can also be provided that maintains a top portion of the hinge 112.

The container 100 can also include a middle portion 108. In some implementations of the container 100, the middle portion 108 is absent making the container 100 smaller and having less of a width. The middle portion 108 can be filled with a number of different items that will be described in further details below. On one end of the container 100 was the hinge 112. On a distal end from the hinge 112, as shown in FIG. 1, another section 110, or slot, can be provided. This section 110 can hold and maintain an electronic cigarette 150. Other items can also be placed within this section 110 as well.

Figure 2:
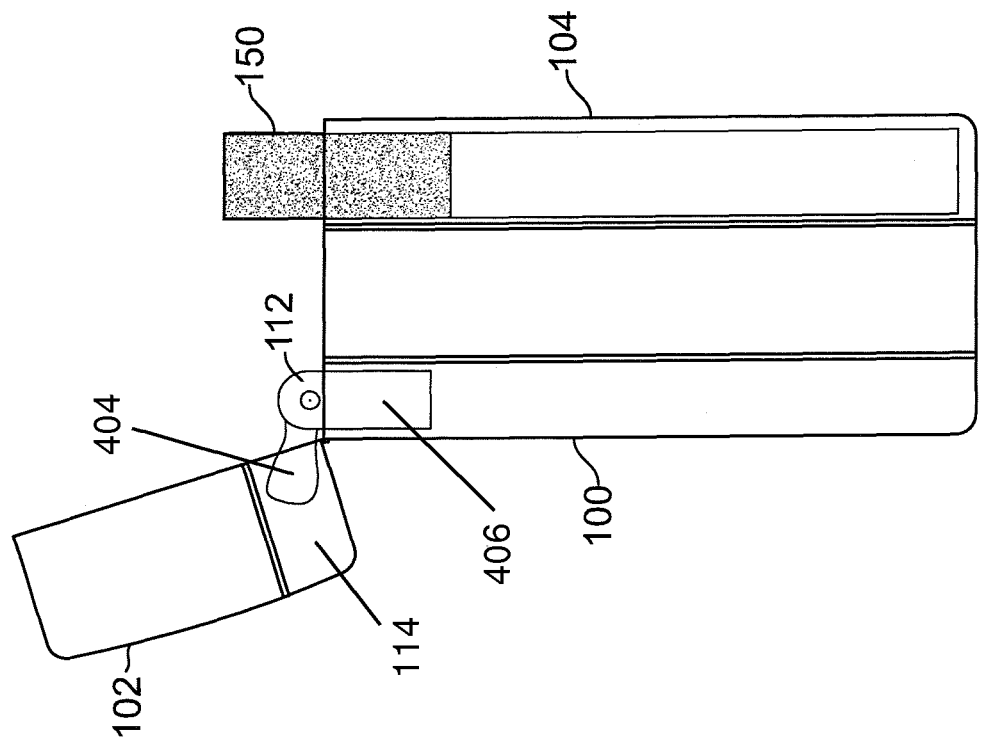
FIG. 2 is a side view of the exemplary container of FIG. 1 opened.

In section 110, where the electronic cigarette 150 is placed, a spring loaded mount can be provided. The spring loaded mount can be used to hold and retain the electronic cigarette 150 or be used to extend the cigarette 150 outwards. FIG. 2 is a side view of the exemplary container 100 of FIG. 1 opened. As shown, the hinge 112 can be manipulated such that the cover 102 and base 104 is opened. At the point where the cover 102 and base 104 are connected, a pivot can be used. The pivot can allow the hinge 112 to open and close the container 100. When opened through the hinge 112, the contents of the container 100 can be exposed.

FIG. 3 is a side view of the exemplary container 100 of FIG. 1 having the alternative smoking device 150 extracted. The electronic cigarette 150 can be pulled from the base 104 while the cover 102 is opened through the hinge 112. This can be accomplished by the user using their finger and sliding the cigarette 150 out. Alternatively, the spring loaded mount can be used. By way of a non-limiting example, the mount can be used to retain the cigarette 150 through a clasp. When pressed down, the clasp would be released at the same time being raised. The raised electronic cigarette 150 can then be easily extracted out of the container 100. When the user wishes to store the cigarette 150, the user can simply slide it into the section 110 and press it against the spring loaded mount. The clasp can then retain and hold the cigarette while lowering it into the container 100. Both traditional cigarettes and electronic cigarettes 150 can be used with the spring loaded mount.

FIG. 4 is a side view of the exemplary container 100 of FIG. 1 showing a sample closing mechanism 112 for the holder, or hinge. The hinge 112 can be fit within the section 106 closest to the pivot connecting the base 104 to the cover 102. The hinge 112, as shown, is distal from the electronic cigarette 150. The hinge 112 can include a segment 406, lever 404 and spring 402. The segment 406 can provide a base for the spring 402. The segment 406 can be fitted into the section 106 of the container 100. It can either extend all the way into the section 106 or a portion thereof. The lever 404 can be fit into the cover 102. The cover 102 can have its own section 114 for placing the lever 404 into so that it catches when the container 100 is being opened and closed. The lever 404 may have a first position when the container 100 is closed as shown in FIG. 1, and a second position (different from the first position) when the container 100 is opened as shown in FIG. 2. When the container 100 is closed, the top end of the lever 404 farthest from the base 104 may be spaced from the top of the cover 102 as shown in FIG. 1, and when the container 100 is opened, the space between the top end of the lever 404 and the top of the cover 102 may be larger than when the container 100 is closed as shown in FIG. 2. When the container 100 is closed, the entire lever 404 may be within the cover 102 as shown in FIG. 1. When the container 100 is opened, a portion of the lever 404 may be outside the cover 102 as shown in FIG. 2.

The spring 402 within the hinge 112 can provide tension to the hinge 112. This tension can be used to manipulate the cover 102 of the container 100 such that it is in a closed, opened and middle position. In an opened position, the cover 102 is flipped back as shown in FIG. 4, shut as shown in FIG. 1 and halfway between when in a middle position. Depending on the tension of the spring 402, different positions of the cover 102 can be achieved.

FIG. 5 is a side view of the exemplary container 100 of FIG. 1 having the alternative smoking device 150 inserted along with other products. As described earlier, a middle section 108 can be provided within the container 100. Through this middle section 108 a number of different items can be stored. While the container 100 was broken into multiple sections 106, 108 and 110, the container 100 does not have to be separated. Furthermore, those dividers that extend along the length of the container 100 can be fully extended (as shown) or partially extended.

Often times, smokers tend to carry tobacco cigarettes 502 as well as electronic cigarettes 150, or other implements. When the user is inside, they can smoke the smoking device 150 and when they are outside they can smoke tobacco cigarettes 502 carried within the container 100. The container 100 can thereby provide a smoker with a variety of choices. The traditional cigarettes 502 can be placed within the middle section 108 as described above. Preferably, middle section 108 is dimensioned to be able to accommodate more than one cigarette, whether more than one (e.g., two) electronic cigarettes 150, more than one (e.g., two) tobacco cigarettes 502, or a combination of electronic cigarettes 150 and tobacco cigarettes 502 (e.g., one of each). Of course, it would also be possible to dimension middle section 108 so that it can hold only a single electronic cigarette 150 or a single tobacco cigarette 502.

FIG. 6 is a side view of the exemplary container of FIG. 1 having the electronic cigarette 150 inserted along with other products and an ignition source 602. The container 100 can also provide a flame through the ignition source 602 for traditional tobacco cigarettes 502 that can be stored within the middle segment. In one embodiment, the flame can be automatically started when the container 100 is opened. A switch can be provided to turn on and off the flame such that when it is opened, but the switch is turned off, the flame would not start. Through this, a user can carry an electronic cigarette 150 and traditional cigarette 502 with ignition source 602.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A container having a length dimension, a width dimension, and a depth dimension, wherein a depth of the container is less than a width of the container, and the width is less than a length of the container, the container comprising:
    a base including a first section and a second section each extending along a length of the base, the first and second sections being at least partially partitioned from each other;
    a cover coupled to the base and configured to form a seal with the base;
    a closing mechanism configured to pivot the cover towards the base for closing the container and away from the base for opening the container, the closing mechanism including a lever; and
    at least one electronic cigarette disposed in the first section or the second section;
    wherein the cover includes a space to receive the lever, an end of the lever farthest from the base being spaced from a top of the cover, and the lever being movable relative to the cover.

2. The container of claim 1, wherein the lever has a first position relative to the cover when the container is closed and a second position relative to the cover when the container is open.

3. The container of claim 2, wherein, in the first position, an entirety of the lever is within the cover, and in the second position, at least a portion of the lever is outside the cover.

4. A container having a length dimension, a width dimension, and a depth dimension, wherein a depth of the container is less than a width of the container, and the width is less than a length of the container, the container comprising:
    a base having a substantially rectangular shape;
    a cover coupled to the base;
    a hinge including a segment and a lever, wherein the lever pivots relative to the segment to pivot the cover towards the base for closing the container and away from the base for opening the container, and wherein the lever has a first position relative to the cover when the container is closed and a second position relative to the cover when the container is open, an end of the lever farthest from the segment being spaced from a top of the cover; and
    an electronic cigarette disposed in the base;
    wherein the length of the container corresponds to a length of the electronic cigarette, the cover including a space for receiving a portion of the electronic cigarette.

5. The container of claim 4, wherein the base includes at least two sections partially partitioned from each other, the electronic cigarette being disposed in one of the two sections.

6. The container of claim 4, wherein the lever is closer to a top of the cover in the first position than in the second position.

* * * * *